Patented Sept. 25, 1928.

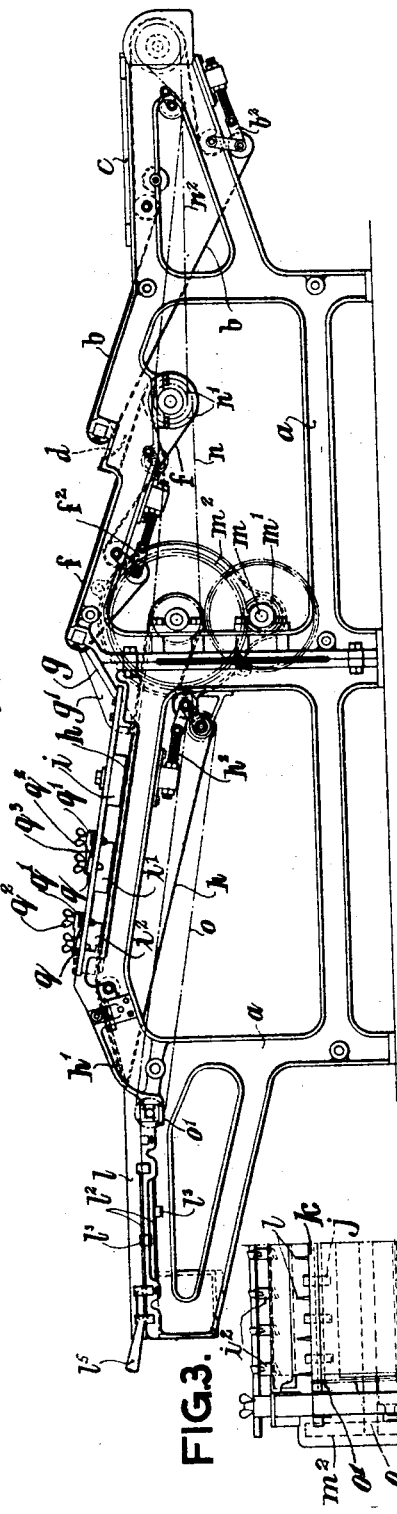
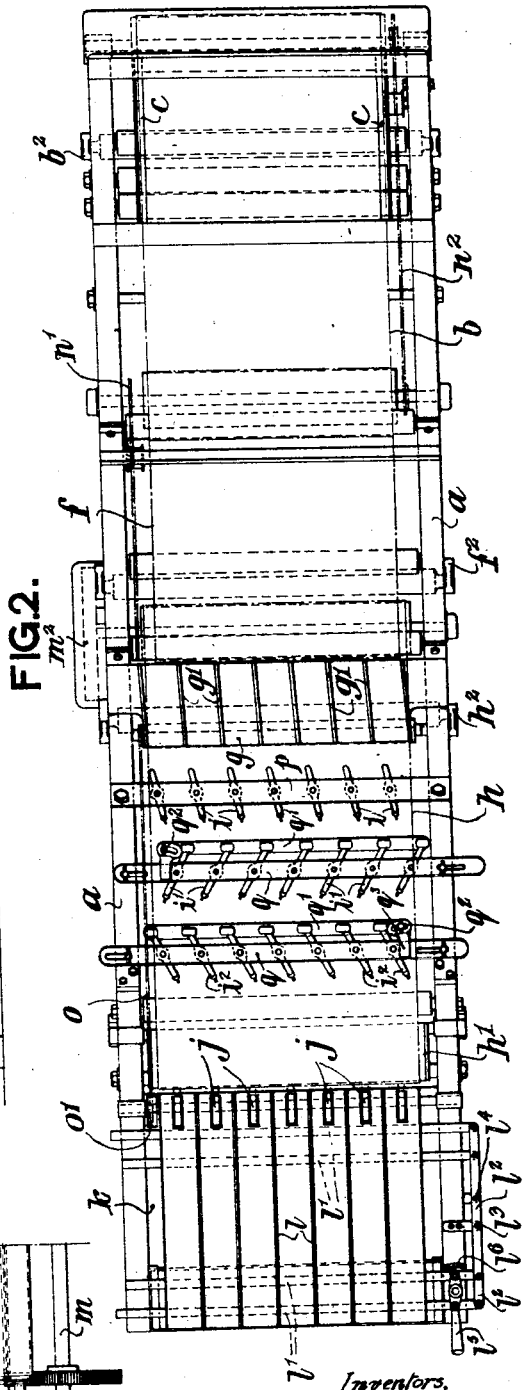

1,685,335

UNITED STATES PATENT OFFICE.

JOHN CURRIE PATERSON AND GEORGE RALPH BAKER, OF LONDON, ENGLAND, ASSIGNORS TO BAKER PERKINS COMPANY INCORPORATED, OF NEW YORK, N. Y., A CORPORATION OF NEW YORK.

APPARATUS FOR SORTING AND STACKING BISCUITS AND OTHER ARTICLES.

Application filed August 4, 1926, Serial No. 127,117, and in Great Britain August 19, 1925.

This invention relates to apparatus for sorting and stacking biscuits and similar articles; that is to say, separating said biscuits into definite rows or lines, and placing them on edge in a position to be readily grasped or removed as for packing operations.

The invention primarily embodies improved sorting means for positively and efficiently arranging the articles in rows prior to stacking and comprises a conveyor adapted to feed the articles to an inclined chute provided with spaced partitions inclined to the direction of travel and between which they slide by gravity in rows to another conveyor which passes them between other series of partitions arranged at different relative angles which act to further align and arrange the articles in rows.

The first mentioned partitions act to direct rectangular articles with their longest dimension parallel to said partitions or generally parallel to the direction of travel through the apparatus.

The invention also comprises other details of construction, arrangement and combination of parts as set forth in appended claims and hereinafter described with reference to the accompanying drawings in which:

Fig. 1 is a side elevation of a complete sorting and stacking apparatus particularly adapted for dealing with biscuits; Fig. 2 is a plan view of Fig. 1 and Fig. 3 is a half end view from the left of Fig. 1.

The apparatus illustrated in the drawings comprises a frame $a$ supporting a conveyor or band $b$ preferably of the endless variety on to which the biscuits are fed in a pell-mell fashion between lateral guides $c$ and on which they may be inspected for removal of faulty ones if present, and when necessary turned by operatives to present all the same face upwards. This conveyor is suitably inclined upwards in the direction of its travel and adjacent its end there is provided a device, conveniently in the form of a curved chute $d$, which will deliver the biscuits in a reversed condition to a second endless conveyor or band $f$, also appropriately inclined upwards in the direction of its travel while on this second conveyor, the biscuits may be further inspected and faulty ones removed if present. Thus both sides or faces of the biscuits are presented for inspection.

The biscuits are carried along on the last-named conveyor $f$ in disarranged or disordered condition and it is necessary to align or arrange them in definite rows or lines in order that they may be properly stacked, or readily handled for packing. In order to effect this the biscuits pass over the end of the said conveyor onto a somewhat steeply and downwardly inclined board or chute $g$ having a plurality of upstanding ribs or partitions $g^1$ which divide said board into a number of separate paths slightly inclined or at an angle to the longitudinal axis of the machine. Said partitions are preferably made shallow at the feed end and deeper at or towards the delivery end of the chute as illustrated in Fig. 1, thus causing any biscuits which ride on the partitions to slide off on to the chute and pass down against said partitions. The said sloping partitions furthermore cause rectangular or flat sided biscuits to slide down with a flat edge against the partition, usually reaching the bottom of the slope with the longest dimension parallel with the partitions, but where the biscuits are substantially rectangular they may be nearly broadside on at this stage.

After having traversed the inclined chute $g$ by gravity in the manner stated, the biscuits pass on to a further conveyor $h$ again somewhat upwardly inclined, on which they are subjected to further aligning operations by passing successively between other series of spaced partitions $i$ $i^1$ $i^2$ located above the conveyor and arranged at opposite angles to one another alternately (see Fig. 2); for example, there may be three such additional series of partitions, the first series $i$ arranged at approximately the same angle to those of the chute, the second series $i^1$ at an opposite angle to the first series $i$ and the third series $i^2$ at an opposite angle to the second series $i^1$. These further partitions act in a similar manner to those of the board to arrange the biscuits in rows, and turn rectangular or square biscuits where necessary to bring them into alignment until as they issue from the paths between the final partitions $i^2$ they are all in proper order with their longest dimension parallel with the travel of the conveyor in the respective rows.

At the ends of the final partitions the conveyor $h$ preferably inclines downwardly as at $h^1$ and passes the biscuits to stacking devices which may be of the kind disclosed in the specification of application No. 93,617, filed on March 9, 1926, by Hemming Alarik Elfving; such devices including for each row a paddle or bucket cage wheel $j$ adapted to collect the biscuits and transfer them to a stacking table $k$ on edge between spaced guides $l$. The invention however may be used with any other convenient arrangement for stacking the biscuits or where biscuits are required to be arranged in any other convenient rows or stacks. The invention however contemplates spacing said guides $l$ at distances apart sufficient to accommodate the largest size of biscuits, and also contemplates the provision of means for adjusting the distance between the guides according to the particular size being dealt with at the time; such adjusting means embodying, for example, cross rods $l^1$ whereon guides $l$ are mounted, these rods being movable in opposite directions due to their being pivoted to two lateral bars $l^2$ which are themselves pivoted at $l^3$, $l^4$, the said bars being rocked and the rods adjusted by means of a hand lever $l^5$ having a pointer working over a scale $l^6$ graduated according to the various sizes of biscuits.

Any appropriate means for mounting and driving the movable or adjustable parts of the apparatus may be adopted, for example as shown in the drawings in which the conveyors $b$ $f$ and $h$ are carried by suitable guiding and driving pulleys, certain of which are in the form of jockeys having devices $b^2$, $f^2$ and $h^2$ respectively for tensioning purposes.

The conveyors may be driven from a main shaft $m$ through gearing $m^1$ $m^2$ and chain and sprocket or belt and pulley gear $n$, $n^1$, $n^2$ respectively. Other chain and sprocket or belt and pulley gear $o$ $o^1$ also driven from the main shaft effects the drive of the stacking bucket wheels $j$. The partitions $i$, $i^1$, $i^2$ may also be mounted as to the first series rigidly on a cross bar $p$ in fixed relation to the partitions $g^1$ of the chute $g$ and as to the two following series adjustably on cross bars $q$ which are themselves adjustably mounted on the machine framing $a$. The tails of the partitions are pivotally connected to adjusting bars $q^1$ the position of which in relation to the cross bars $q$ can be varied to alter the angle of the partitions according to requirements, the said bars $q^1$ being then held in position of adjustment by thumb nuts $q^2$ working through slotted brackets $q^3$.

What we claim as our invention and desire to secure by Letters Patent of the United States is:—

1. Apparatus for sorting biscuits and other articles comprising a conveyor adapted to feed the articles to an inclined chute provided with spaced partitions inclined to the direction of travel and between which the articles slide by gravity in rows, and a second conveyor receiving the articles from the chute and from which they pass between other series of partitions arranged at different relative angles which act to further align and arrange the articles in rows.

2. Apparatus according to claim 1 in which the chute partitions are shallow at the feed end and deeper at or towards the delivery end, said partitions acting to direct rectangular articles with their longest dimensions parallel to said partitions or generally parallel to the line of travel through the apparatus.

3. Apparatus according to claim 1 in which, of the partitions following the chute, the first series are at substantially the same angle as those of the chute, whilst following series are at alternately opposite angles, and means for adjusting the degree of angularity of certain of said partitions.

In witness whereof we have signed this specification.

JOHN CURRIE PATERSON.
GEORGE RALPH BAKER.